United States Patent [19]

Beutner et al.

[11] 3,869,257
[45] Mar. 4, 1975

[54] PRODUCTION OF NICKEL SULFATE

[75] Inventors: Heinz Paul Beutner, Englewood, Colo.; George Feick, Needham, Mass.

[73] Assignee: The International Nickel Company, Inc., New York, N.Y.

[22] Filed: Aug. 17, 1972

[21] Appl. No.: 281,486

[52] U.S. Cl. ............... 423/544, 423/149, 423/417, 423/512, 423/592
[51] Int. Cl... C01b 17/96, C01g 53/02, C01g 53/10
[58] Field of Search ........... 423/544, 415, 417, 146, 423/138, 149, 416, 558, 512, 592; 75/116, 119

[56] References Cited
UNITED STATES PATENTS

| | | | |
|---|---|---|---|
| 1,047,825 | 12/1912 | McKechnie et al. | 423/544 |
| 2,772,947 | 12/1956 | Sowerwine, Jr. | 423/544 |
| 3,002,814 | 8/1961 | Horrigan | 423/544 |
| 3,256,060 | 6/1966 | Globus | 423/417 |

FOREIGN PATENTS OR APPLICATIONS

| | | | |
|---|---|---|---|
| 1,064,248 | 4/1967 | Great Britain | 75/119 |

*Primary Examiner*—O. R. Vertiz
*Assistant Examiner*—Gary P. Straub

[57] ABSTRACT

A process for the production of nickel sulfate which comprises reacting nickel carbonyl, sulfur dioxide and oxygen together to form a mixture of nickel sulfate, nickel sulfite and nickel oxide, converting the nickel sulfite and nickel oxide to nickel sulfate and recovering the thus produced nickel sulfate. Advantageously, the process of the present invention contemplates reacting the nickel carbonyl, sulfur dioxide and oxygen in the gas phase at a temperature of about 100°C.

8 Claims, 1 Drawing Figure

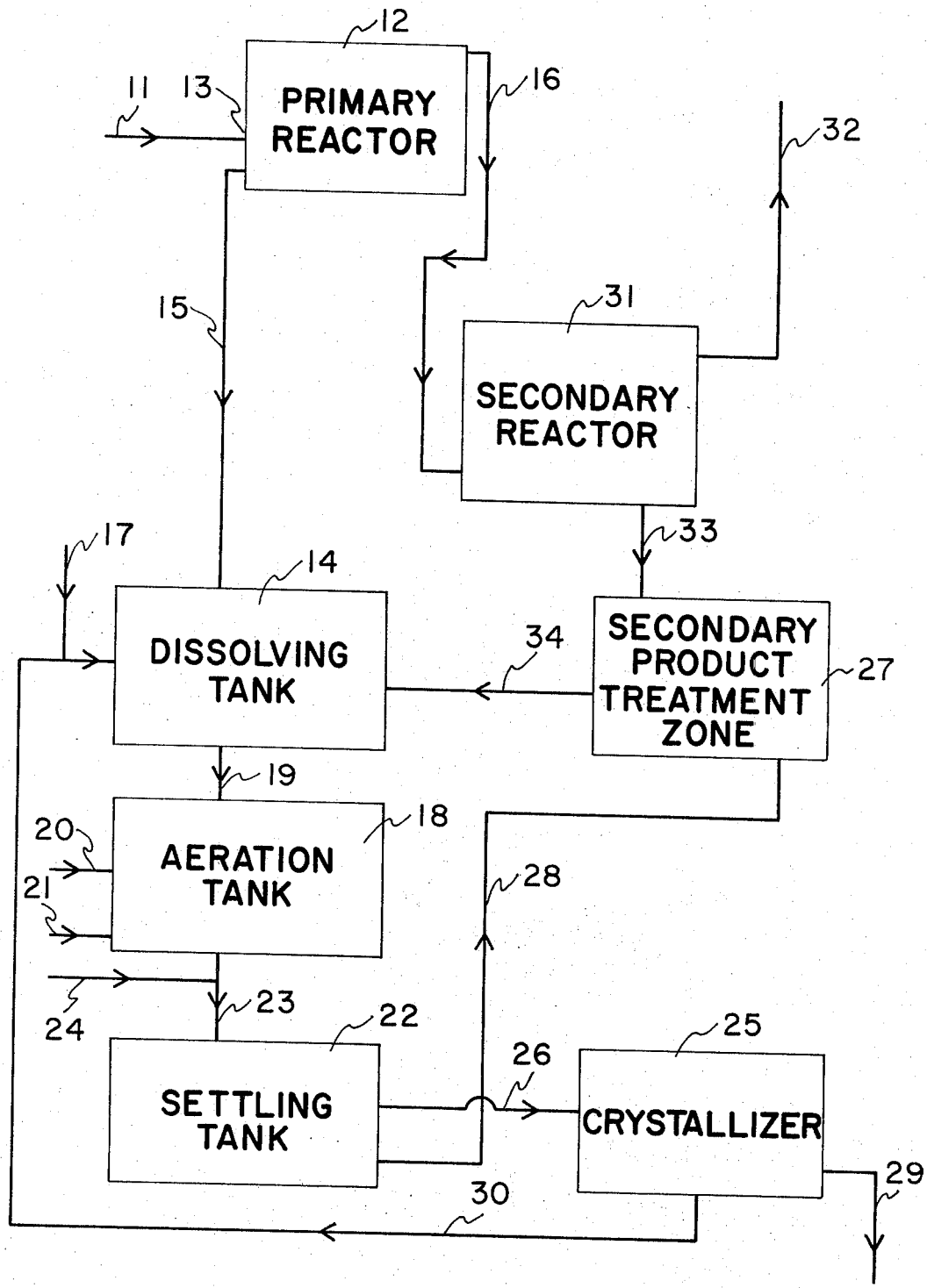

3,869,257

PRODUCTION OF NICKEL SULFATE

The present invention is concerned with the manufacture of nickel sulfate and, more particularly, with the manufacture of nickel sulfate from nickel carbonyl.

It is well known that in processes of extracting nickel from its ores, one commercially important process involves the selective carbonylation of nickel-containig material to form nickel tetracarbonyl (referred to hereinafter as "nickel carbonyl"). It would be highly advantageous, and is generally the object of the present invention, to convert nickel carbonyl directly into nickel chemicals such as nickel sulfate. The formation of nickel sulfate directly from nickel carbonyl is highly advantageous in that nickel carbonyl can easily be prepared as a very pure material. Consequently, it is expected that nickel sulfate prepared from nickel carbonyl will have a very high degree of purity with respect to other metallics. Obtaining such a high degree of purity in nickel sulfate made by other methods sometimes involves considerable difficulty.

It has now been discovered that by means of a special process nickel sulfate can be prepared from nickel carbonyl efficiently and in excellent yield.

It is an object of the present invention to provide a novel process for producing nickel sulfate from nickel carbonyl.

It is another object of the present invention to provide a novel process of providing nickel sulfate from nickel carbonyl wherein carbon monoxide employed in or produced in the process is recovered and reused.

Other objects and advantages will become apparent from the following description taken in conjunction with the drawing which depicts a schematic flow sheet of the process of the present invention.

Generally speaking, the present invention comprises a process wherein nickel carbonyl, sulfur dioxide and oxygen gas are reacted at a temperature of at least about 80°C., for example, at about 100°C. to about 250°C. to produce a product containing nickel sulfate, nickel sulfite, nickel oxide and a small amount of nickel sulfide. The reaction products are then treated to produce nickel sulfate from the nickel sulfite and nickel oxide and the thus produced nickel sulfate is recovered from the products of reaction. Advantageously, recovery is achieved by crystallization of the nickel sulfate from an aqueous solution as nickel sulfate hexahydrate.

A schematic flow sheet of the process of the present invention is illustrated in the drawing. Referring now thereto, a mixture of nickel carbonyl, sulfur dioxide and oxygen is introduced through incoming feed line 11, into primary reactor 12. Advantageously, the incoming feed 11 terminates in a water-cooled nozzle 13, which inhibits reaction of the incoming feed in line 11. Primary reactor 12 comprises a void space enclosed by walls plus a means for scraping reaction products from the walls. The reaction of the incoming feed is essentially exothermic and it is most advantageous to maintain the temperature of the void space in the reacting materials at about 100°C. It is possible to operate the primary reactor at a temperature within the range of about 100°C. to about 150°C. Using good engineering construction practice involving adequate heat insulation on the exterior of primary reactor 12, it is practical to initiate reaction in primary reactor 12 and thereafter carrying out the reaction in primary reactor 12 without further addition of heat. The reaction is exothermic and with proper heat balance supplies sufficient energy to reactor 12 for continuous operation. Solid reaction product comprising essentially nickel sulfate and nickel sulfite scraped from the walls of the primary reactor 12 is caused to enter dissolving tank 14 through means 15. While in the drawing means 15 is shown as a simple line, it will be appreciated that screw-conveying means and other means for conveying solids can advantageously be employed for this purpose. Unreacted reagent gases and product gases exit from primary reactor 12 by means of line 16.

Following the solid product exiting from primary reactor 12 through means 15, the product enters dissolving tank 14 and is dissolved therein water which enters the system originally through make-up water means 17. The total product of the dissolving action carried out in tank 14, including both dissolved and undissolved solids is caused to pass into aeration tank 18 through line 19. Aeration tank 18 is provided with air-inlet 20 and steam-inlet 21. By means of air and steam entering through the respective inlets, the contents of aeration tank 18 are heated and oxidized to substantially reduce the content of nickel sulfite and change it to nickel sulfate. After aeration is completed, the products are caused to enter settling tank 22 by means of line 23. Any sulfuric acid needed to make up the sulfate content of the aerated material is caused to enter the system by means of sulfuric acid inlet 24. Solutions substantially free of suspended solids, separated in settling tank 22 are caused to pass into crystallizer 25 by means of line 26. Solids from settling tank 22 are fed to secondary product treatment zone 27 by means 28. The end product of crystallizer 25 which normally is nickel sulfate hexahydrate, exits through means 29, while the mother liquor is returned to dissolving tank 14 through line 30. It will be appreciated that initially a substantial amount of water enters the system through line 17 to provide a working amount of liquid in dissolving tank 14, aeration tank 18, settling tank 22 and crystallizer 25. In operation, only that water represented by water crystallization of product 29 plus any incidentally lost water enters into the system through make-up water means 17.

Unreacted gases and product gases exiting from primary reactor 12 through line 16 enter secondary reactor 31. Secondary reactor 31 has essentially the same basic equipment as primary reactor 12, but is operated at a temperature within the range of about 150°C. to about 250°C. so as to cause completion of the reaction initiated in primary reactor 12. Because the concentration of reagents is low in secondary reactor 31, exothermic heat is insufficient to sustain reaction therein. Accordingly, it is necessary to supply heat substantially continuously to secondary reactor 31 in order to assure completeness of reaction. Those skilled in the art will appreciate that line 16 connecting primary reactor 12 and secondary reactor 31 will be short, it will have a large cross-sectional area and advantageously will be externally cooled so as to inhibit reaction and deposition of solid product in line 16. Product gas exiting from secondary reactor 31 is essentially carbon monoxide and passes out of the system through line 32 into means, not illustrated, for production of additional nickel carbonyl feed. The solid product of secondary reactor 31 is less pure than the solid product of primary reactor 12. It contains a greater percentage of nickel sulfide and may contain nickel produced by thermal decomposition of nickel carbonyl. Accordingly, the solid products of secondary reactor 31 passing out of secondary reactor 31 by means 33 are caused to enter secondary product treatment zone 27. In secondary product treatment zone 27, the product of secondary reactor 31 along with solids from settling tank 22 is subjected to a high temperature oxidation, for example, at a temperature of about 500°C. to about 800°C. to oxidize any nickel sulfide present to nickel sulfate. As an additional step, if substantial amounts of nickel metal are present in secondary product treatment zone 27, the nickel metal (or more accurately nickel oxide resulting from high temperature oxidation thereof) is reacted with sulfuric acid to form nickel sulfate. Product exiting from secondary product treatment zone 27 is caused to pass by means 34 into dissolving tank 14 and thus enters the circuit employed for treatment of the solid product of primary reactor 12.

The feed entering primary reactor 12 through line 11 advantageously comprises approximately equal mole amounts of nickel carbonyl, sulfur dioxide and oxygen in accordance with the following equation which is overly simplified and is not intended to represent the actual reaction or reactions occurring when carrying out the process of the present invention.

$$Ni(CO)_4 + SO_2 + O_2 \rightarrow NiSO_4 + 4CO$$

Those skilled in the art will appreciate that any one or more of the incoming reagents can be in stoichiometrical excess. However, since it is advantageous to collect and recirculate carbon monoxide for reaction with nickeliferous material to provide additional amounts of nickel carbonyl, excess quantities of sulfur dioxide and oxygen must be removed from the tail gas before the carbon monoxide can be reused for the intended purpose. Accordingly, if excess amounts of reagent are employed, it is advantageous to use nickel carbonyl in slight excess. A slight excess of nickel carbonyl will thermally decompose under the reaction conditions present in secondary reactor 31 releasing carbon monoxide as essentially the only gaseous product of said thermal decomposition. Those skilled in the art will also appreciate that in the incoming feed entering primary reactor 12 through line 11, an excess amount of carbon monoxide or other gas inert with respect to the process, e.g., nitrogen, can also be used. Excess amount of carbon monoxide is advantageously used as a carrier gas for the nickel carbonyl. Good mixing of the feed gases entering primary reactor 12 is essential to efficient operation of primary reactor 12. As mentioned hereinbefore, nozzle 13 which is the means whereby feed gases enter primary reactor 12 is water cooled. Water-cooling means or other means serving the same function is necessary in order to prevent reaction in line 11, deposition of solid product therein and ultimate blockage of line 11. In order to promote good mixing of gas feeds at or about nozzle 13, it is advantageous to mix gas streams having substantially different linear velocities. This promotes turbulent flow and consequent good mixing. As a caution, it is to be observed that oxygen or oxygen-containing gas should not be premixed with nickel carbonyl in the absence of sulfur dioxide. A mixture of oxygen plus nickel carbonyl in the absence of sulfur dioxide is destructively explosive over a wide compositional range.

As an alternative to the product treatment scheme as set forth in the drawing, nickel sulfite, exiting from primary reactor 12, can be reacted with sulfuric acid, for example, in dissolving tank 14 to form nickel sulfate and sulfur dioxide. The sulfur dioxide can then be recovered and used as part of the feed entering through incoming feed line 11. Since tests have shown that approximately equal quantities of nickel sulfate and nickel sulfite are usually produced in primary reactor 12, approximately one-half the sulfur dioxide required as feed in line 11 can be supplied from reaction between nickel sulfite and sulfuric acid. Those skilled in the art will appreciate that if nickel sulfite is treated with sulfuric acid, there is no need for aeration such as carried out in aeration tank 18 as shown in the drawing.

For purposes of giving those skilled in the art a better understanding and appreciation of the invention, the following Examples are given.

EXAMPLES

A reactor was set up comprising a liquid-cooled reagent inlet means at the top of a vertically standing, externally heated, tubular reaction chamber having a bottom opening onto a product-collecting chamber fitted with a tail gas exit. Reagent gas at a total pressure of about one atmosphere and containing equal per cents by volume of nickel carbonyl, sulfur dioxide, oxygen and carbon monoxide were fed to the reaction chamber under the conditions and with the results as set forth in Table I. Numbered runs in Table I and elsewhere in this specification are examples of the process of the present invention whereas runs designated by letters are outside the ambit of the present invention.

TABLE I

| Run | 1 | 2 | 3 | 4 | A | 5 |
|---|---|---|---|---|---|---|
| Space Velocity (hr$^{-1}$) | 500 | 700 | 300 | 700 | 300 | 1600 |
| Temperature (°C.) | 120 | 120 | 120 | 220 | 75 | * |
| Ni Sulfide (%) | 0.8 | 3.2 | 0.6 | 2.7 | None | 1.5 |
| Ni as Sulfate **(%) | 99.2 | 96.8 | 99.4 | 97.3 | None | 98.5 |

* Run 5 was operated as a self-sustaining reaction after initial ignition.
** Percentage of product in the form of nickel sulfate, nickel sulfite and nickel oxide, all being recoverable as nickel sulfate upon air oxidation in aqueous media plus treatment with dilute sulfuric acid.

The date in Table I shows that excellent results are attained with the process of the present invention operated at temperatures in excess of about 80°C. and at normal atmospheric pressure. While pressures in excess of atmospheric can be used, the reactions of the process of the present invention proceed at a reasonable rate using relatively concentrated gas mixtures at atmospheric pressure. With more dilute gas mixtures, adequate reaction rates can be attained at somewhat higher temperatures, e.g., about 150°C. to about 250°C. than those considered optimum. However, at these higher temperatures, production of relatively large amounts of nickel sulfide is likely. Pressures higher than atmospheric pressures can also be used with advantage with relatively dilute mixtures of reactants.

EXAMPLE 6

A gas mixture containing 12.5 volume percent each of carbon monoxide, nickel carbonyl and sulfur dioxide and 62.5 volume percent air was reacted at about 100°C. and atmospheric pressure. The resultant product contained about 60.4% nickel sulfate with the balance, except for a small percentage being nickel-containing material readily converted to nickel sulfate. This example shows that air can be used as a source of oxygen for purposes of the process of the present invention.

EXAMPLES 7 & 8

Two runs were made employing feed gases containing 40 volume percent each of nickel carbonyl and sulfur dioxide and 20 volume percent of oxygen. In both of these runs nickel sulfate and products readily converted to nickel sulfate were obtained at reaction temperatures of 100°C. to 120°C. A comparative run made in the absence of oxygen resulted only in the deposition of nickel metal. Attempts to conduct a reaction between nickel carbonyl and oxygen in the absence of sulfur dioxide resulted in violent explosions.

EXAMPLE 9

A gas mixture containing equal volume percents of carbon monoxide, nickel carbonyl, sulfur dioxide and oxygen was bubbled through an aqueous solution containing 60 percent by weight of sulfuric acid held at 130°C. A significant amount of nickel sulfate was produced, dissolved in the aqueous acid and recovered therefrom. Other aqueous solutions capable of being maintained at reaction temperatures of about 130°C. and having relatively low partial pressures of water vapor at said temperatures (e.g., ethylene glycol-water-nickel sulfate solutions) can be used in place of aqueous sulfuric acid solutions.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for the production of nickel sulfate comprising reacting together nickel carbonyl, sulfur dioxide and oxygen at a temperature of about 80° to 150°C to produce reaction products thereof consisting essentially 2. The process as in claim 1 wherein said reaction products are oxidized by aeration in the presence of water to convert the nickel sulfite to nickel sulfate prior to the separation of the nickel sulfate from the reaction products.

3. The process as in claim 1 wherein said reaction products are reacted with sulfuric acid to convert the nickel sulfite therein to nickel sulfate and sulfur dioxide prior to the separation of the nickel sulfate from said reaction products.

4. The process as in claim 1 wherein the reaction products are dissolved in water and nickel sulfate is recovered therefrom as nickel sulfate hexahydrate by crystallization.

5. The process as in claim 1 wherein the nickel carbonyl, sulfur dioxide and oxygen are present in substantially equi-molar amounts.

6. The process as in claim 1 wherein carbon monoxide is recovered from the reaction products and reacted with nickeliferous material to provide additional nickel carbonyl.

7. A process for the continuous production of nickel sulfate from nickel carbonyl comprising continuously reacting together nickel carbonyl, sulfur dioxide and oxygen at a temperature of about 80° to 150°C to provide solid reaction products consisting essentially of nickel sulfate, nickel sulfite and nickel oxide and gaseous reaction products, dissolving soluble solid reaction products in water to provide an aqueous solution of said soluble solid reaction products, treating solid reaction products insoluble in water in the presence of said aqueous solution of said soluble solid reaction products by aerating the solution, then acidifying the solution with sulfuric acid to maximize the nickel sulfate content of said aqueous solution, recovering nickel sulfate from said aqueous solution, recovering carbon monoxide from said gaseous reaction products and recycling said recovered carbon monoxide to form nickel carbonyl.

8. The process as in claim 7 wherein nickel sulfate is recovered from the aqueous solution by crystallization as nickel sulfate hexahydrate.

* * * * *

UNITED STATES PATENT OFFICE
CERTIFICATE OF CORRECTION

PATENT NO. : 3,869,257
DATED : March 4, 1975
INVENTOR(S) : HEINZ PAUL BEUTNER and GEORGE FEICK It is certified that error appears in the above-identified patent and that said Letters Patent are hereby corrected as shown below:

Claim 1 should read as follows:

1. A process for the production of nickel sulfate comprising reacting together nickel carbonyl, sulfur dioxide and oxygen at a temperature of about 80°C to 150°C to produce reaction products thereof consisting essentially of nickel sulfate, nickel sulfite and nickel oxide, and separating the nickel sulfate from said reaction products.

Signed and Sealed this fifth Day of August 1975

[SEAL]

Attest:

RUTH C. MASON
Attesting Officer

C. MARSHALL DANN
Commissioner of Patents and Trademarks